Sept. 26, 1933.　　　F. T. COURTNEY　　　1,927,921
SPINNER FOR AIRCRAFT PROPELLERS
Filed July 25, 1931　　　2 Sheets-Sheet 1

INVENTOR
Francis T. Courtney
BY
O Bayles Newton
ATTORNEYS

Sept. 26, 1933.　　　F. T. COURTNEY　　　1,927,921
SPINNER FOR AIRCRAFT PROPELLERS
Filed July 25, 1931　　　2 Sheets-Sheet 2

Inventor
Francis T. Courtney.
By O'Boyle and Naxton
Attorneys

Patented Sept. 26, 1933

1,927,921

UNITED STATES PATENT OFFICE 1,927,921

SPINNER FOR AIRCRAFT PROPELLERS

Francis T. Courtney, Great Neck, N. Y.

Application July 25, 1931. Serial No. 553,176

4 Claims. (Cl. 244—31)

This invention relates to improvements in spinners for aircraft propellers and more particularly to an auxiliary spinner member for attachment to aircraft propellers.

Heretofore it has been proposed to use freely rotatable spinners mounted on the propeller axis and positioned forward of the propeller in order to stream line the front of an airplane and prevent burbling. Such constructions permit the general stream lining of the fuselage of the machine as well as the cowling of the motor whereby parasitic resistance is minimized. In such constructions the propeller rotates between the freely moving spinner and the engine cowling leaving a dead space around and about the propeller hub. It has been attempted to shield these inefficient portions of the propeller but such shielding has involved the extension of the spinner beyond the propeller blades, the blades usually passing through the extension.

These attempts lead either to heavy spinners rotating with the propeller, or to spinners rotatably connected to the propeller axis, in which case the propeller hub became too large and heavy or a gap between spinner and fuselage cowling defeated the purpose of the spinner.

It is an object of this invention to provide an air guide which is continuous with the cowling and which shields the inefficient portions of the propeller blades.

Another object of this invention is to provide a bridge member between a freely rotating spinner and the engine cowling.

Yet another object of this invention is the provision of such an improved air guide which is attached to the propeller and rotates therewith.

Yet a further object of this invention is the provision of such improved air guide which is adapted to be made in a plurality of parts and fitted on to a propeller.

It is also an object of this invention to provide an air guide for shielding inefficient portions of aircraft propellers which combines light weight with low strength requirements and cheap manufacturing costs.

These and other desirable objects and advantages of the present invention will be illustrated in the accompanying drawings and described in the specification, certain preferred embodiments being shown by way of illustration only, for, since the underlying principles may be incorporated in other specific mechanical devices, it is not intended to be limited to the ones here shown except as such limitations are clearly imposed by the appended claims.

In the drawings like numerals refer to similar parts throughout the several views, of which Figure 1 is a vertical cross section through the front of an airplane fuselage, containing a radial air cooled engine, a tractor propeller, a cowling enclosing the engine and air guides connected with a propeller and a spinner in front of the propeller;

Figure 1:
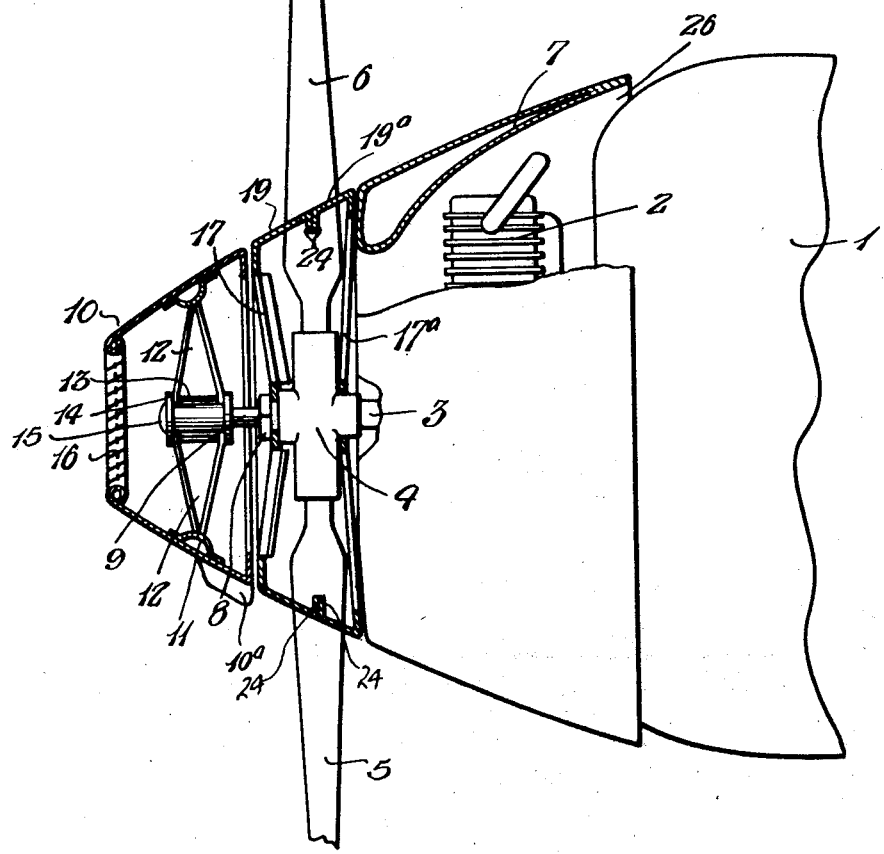

Referring now to the drawings, there is shown in Fig. 1 an airplane fuselage designated generally by the numeral 1, at the forward end of which is mounted a radial air cooled engine 2, provided with a shaft 3, upon which a propeller 4 having blades 5 and 6, of any suitable construction, is keyed or otherwise suitably secured. A cowling 7 is provided for the engine to permit stream lining of the assembly. Lock nuts 8 are provided at the forward end of the propeller hub, and an extension 9 of the shaft is provided to receive a freely rotatable spinner 10 having internal supports 11, the whole being supported on struts 12 secured to the outer portion 13 of the bearing cage, the inner portion 14 of said cage being secured to the extension 9 of the crank shaft and held in position by locking means 15. The vane 10a of the spinner is so constituted and arranged as to inhibit rotation of the spinner, when traveling through the air. In this manner the nose of the machine or spinner is held substantially stationary or its rotation cut down very appreciably so that no considerable stresses are built up by centrifugal force.

The spinner is provided with a central aperture 16 which permits ingress of air for cooling the engine. An adjustable shutter 16a permits a variation of the air volume passing through the aperture 16.

Figure 4:
Fig. 4 is an edge view of the air-guide showing the manner of accommodating the propeller blade.
Figure 2:
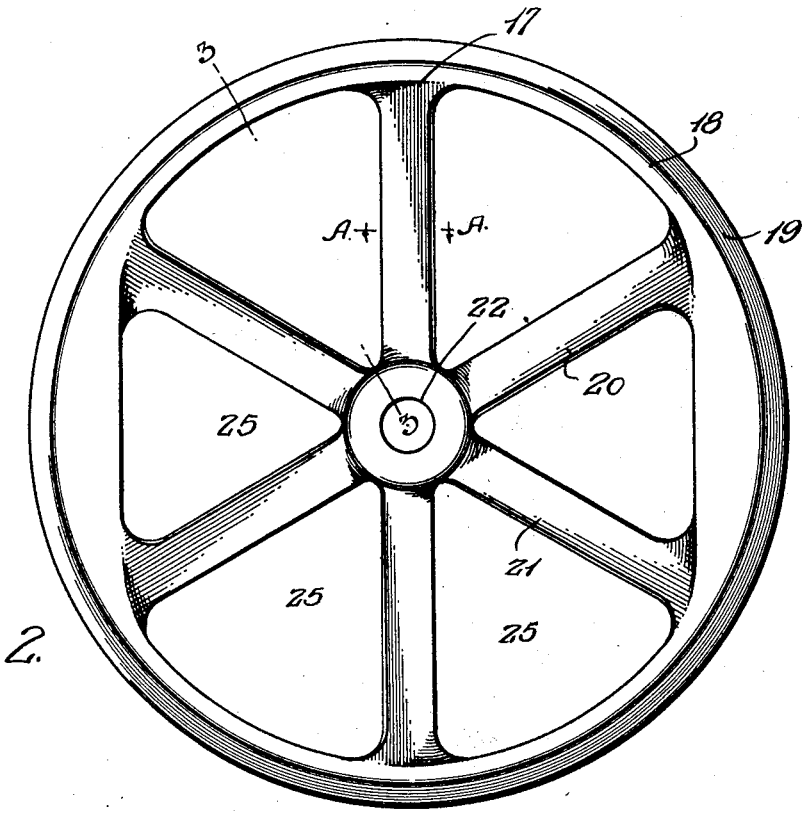
Fig. 2 is a front elevation of an air-guide.
Figure 3:
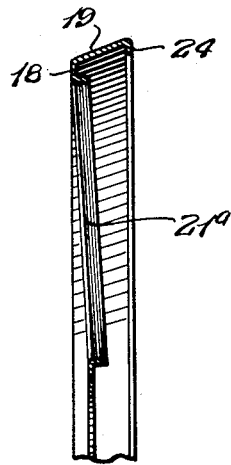
Fig. 3 is a section taken on line 3'—3' of Fig. 2.
Figure 6:

Referring more particularly to Figs. 2, 3 and 4, there is shown an air guide 17 comprising a circular stamped metal member having a rim portion 18 provided with a flanged edge 19 which acts as an air guide coextensive with the cowling 7 and the spinner 10. The member 17, as noted, is generally wheel shaped and is provided with a plurality of radial support members or spokes 11

20. The spokes 20 are twisted and will then serve as a fan to increase the velocity of the cooling air passing through the aperture 16. The air guides are provided with slotted portions 23 adapted to receive the propeller blade and a pair of these members may be adjusted on either side of the propeller in abutting relation with each other. As shown in Fig. 1 these guides are mounted in the following manner. A guide 17a having a rim 19a is adjusted on the crank shaft and the propeller mounted thereon with the slots 23 in adjustment to the propeller. A similar member 17 is then fitted over the front end of the shaft and the propeller so that the edges 24 of the guide sections are substantially in abutting relation. These edges 24 are shown as inturned flanges.

As will be evident from the drawings the rim portions 19 and 19a of the air guide sections are so configured as to present a continuous stream line surface which is a continuation of the exterior surface of the spinner and the cowling.

While the air guide has been disclosed as comprising a plurality of mutually adjustable sections, the invention comprehends the use of a unitary air guide having a continuous rim 19c provided with the usual slot 23, for the reception of the propeller.

Figure 5:
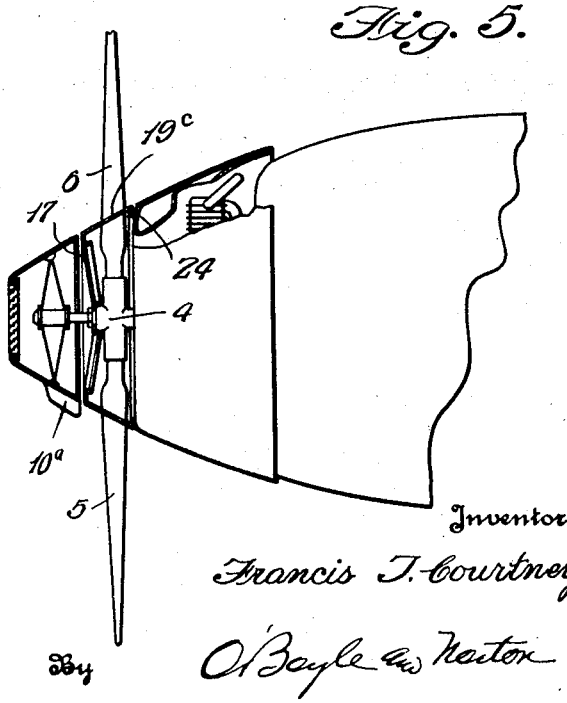
Fig. 5 is a cross section through a propeller showing a modified form of air guide attached thereto.

By the provision of flanged and spoked discs having relatively narrow rims the air guides are kept narrow and coextensive with the width of the propeller, which narrow rims resist the deflecting effect of the centrifugal force better than wider rims. It will of course be appreciated that for small and slow propellers the flanges or rims 19 may be relatively wide. The construction shown in Fig. 5 with the disc in front of the propeller, may, of course, be so configured as to have the same disposed in the rear of the propeller.

The improved air guides of the present invention may be struck out from sheet metal of any suitable gauge and due to their extreme lightness and close fitting to the propeller are adapted to rotate with the latter without introducing any undesirable effects while at the same time providing and serving the desirable function of improved air guides, thus doing away with a gap or step in the air guiding space around and about the propeller. By the provision of the radial apertures 25 in the disc a free flow of air through the nose 16 of the spinner in and around the engine is assured and a free outflow through the slots 26 in the cowling permitted.

While sheet metal has been disclosed as being a suitable material for use in manufacturing improved air guides of the present invention, and among such materials are included light guage sheet steel, aluminum, durulminum, and other such materials commonly used for aircraft construction, the invention also comprehends the use of other materials such as phenolic condensation products, suitably reinforced or not as the case may require. The use of these materials permits the molding of the structures in any desired shape and due to the smooth finish which may be obtained, air resistance is minimized.

It will now be seen that there has been provided an improved air guide assembly for use with free moving spinners for airplanes which assembly is characterized by extreme light weight, high efficiency and low manufacturing costs.

What is claimed is:

1. An aircraft propeller assembly including in combination an engine, a cowling for the engine, a propeller mounted for rotation on the shaft of the engine and forwardly thereof, a freely rotatable spinner on said shaft and spaced from said cowling, and air-guides comprising opposed discs mounted on the propeller and rotatable therewith.

2. An aircraft propeller assembly including in combination an engine, a cowling for the engine, a propeller mounted for rotation on the shaft of the engine and forwardly thereof, a freely rotatable spinner on said shaft and spaced from said cowling, and air-guides comprising a pair of opposed discs mounted on the propeller and rotatable therewith, the periphery of said air-guides being coextensive with the surfaces of said cowling and spinner.

3. An aircraft propeller assembly, including, in combination, a propeller and its driving shaft, an air-guide comprising a pair of opposed discs mounted on the propeller and rotatable therewith, and a separate, freely rotatable air-guide mounted on the said shaft.

4. An aircraft propeller assembly, including in combination, a propeller and its driving shaft, an air-guide mounted on the propeller and rotatable therewith, said air-guide comprising a pair of opposed discs, and a separate, freely rotatable air-guide mounted on the said shaft.

FRANCIS T. COURTNEY.